(12) United States Patent
Bauchot et al.

(10) Patent No.: US 8,207,820 B2
(45) Date of Patent: Jun. 26, 2012

(54) LOCATION LOCALIZATION METHOD AND SYSTEM

(75) Inventors: Frederic Bauchot, Saint-Jeannet (FR);
Jean-Yves Clement, Saint-Jeannet (FR);
Gerard Marmigere, Drap (FR);
Joaquin Picon, Riviera Baie (FR)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 12/180,664

(22) Filed: Jul. 28, 2008

(65) Prior Publication Data

US 2009/0315679 A1 Dec. 24, 2009

(30) Foreign Application Priority Data

Jun. 24, 2008 (EP) .................................. 08305318

(51) Int. Cl.
*G08B 5/22* (2006.01)
*G08B 19/00* (2006.01)
*G06G 7/78* (2006.01)
*G06F 7/00* (2006.01)
*G06F 19/00* (2011.01)

(52) U.S. Cl. ........ 340/8.1; 340/5.92; 340/990; 701/301; 701/302; 700/226; 235/385

(58) Field of Classification Search .................... 340/8.1, 340/539.1–539.2, 572.1, 10.1; 235/385; 701/301, 302; 700/213, 215, 224–229; 705/14.24, 705/22, 28
See application file for complete search history.

(56) References Cited

U.S. PATENT DOCUMENTS 4,237,536 A 12/1980 Enelow et al.
(Continued)

FOREIGN PATENT DOCUMENTS

CA 2417616 7/2002
(Continued)

OTHER PUBLICATIONS

Mary Catherine O'Connor; Aethon Adds RFID to Robotic Hospital Helpers; RFID Journal—RFID (Radio Frequency Identification) Technology News & Features; Retrieved from the Internet: <URL: http://www.rfidjournal.com/article/articleview/3330/1/1/ > [Retrieved Feb. 25, 2008]; 3 pages.

(Continued)

*Primary Examiner* — Benjamin C Lee
*Assistant Examiner* — Omeed Alizada
(74) *Attorney, Agent, or Firm* — Schmeiser, Olsen & Watts; John Pivnichny

(57) ABSTRACT

A location localization method and system. The method includes transmitting by an RFID tag reader, a request for locating a passive RFID tag in a facility. The RFID tag reader receives from a first group of active RFID tags, a first date/time associated with first data. The RFID tag reader transmits to the first group of active RFID tags, a request for retrieving the first data. The first data comprises distances between each active RFID tag of the first group and the passive RFID tag. The RFID tag reader receives the first data. The RFID tag reader receives a map of the facility and locations on the map for the first group of active RFID tags. The RFID tag reader determines a location within the facility for the passive RFID tag based on the first data, the map, and the locations on the map. The RFID tag reader transmits the first location to a user.

20 Claims, 8 Drawing Sheets

U.S. PATENT DOCUMENTS

| | | | |
|---|---|---|---|
| 4,441,288 A | 4/1984 | Feldman et al. | |
| 4,614,945 A | 9/1986 | Brunius et al. | |
| 4,625,473 A | 12/1986 | Peterson et al. | |
| 5,111,184 A | 5/1992 | Heaton et al. | |
| 5,512,879 A | 4/1996 | Stokes | |
| 5,521,601 A | 5/1996 | Kandlur et al. | |
| 5,528,222 A | 6/1996 | Moskowitz et al. | |
| 5,541,577 A | 7/1996 | Cooper et al. | |
| 5,646,592 A | 7/1997 | Tuttle | |
| 5,774,876 A | 6/1998 | Woolley et al. | |
| 5,804,810 A | 9/1998 | Wooley et al. | |
| 5,825,298 A | 10/1998 | Walter | |
| 5,959,568 A | 9/1999 | Woolley | |
| 6,025,780 A | 2/2000 | Bowers et al. | |
| 6,031,457 A | 2/2000 | Bonkowski et al. | |
| 6,104,337 A | 8/2000 | Coutts et al. | |
| 6,137,413 A | 10/2000 | Ryan | |
| 6,255,959 B1 | 7/2001 | Lake et al. | |
| 6,271,753 B1 | 8/2001 | Shukla | |
| 6,275,157 B1 | 8/2001 | Mays et al. | |
| 6,424,264 B1 | 7/2002 | Giraldin et al. | |
| 6,515,591 B2 | 2/2003 | Lake et al. | |
| 6,662,642 B2 | 12/2003 | Breed et al. | |
| 6,720,866 B1 | 4/2004 | Sorrells et al. | |
| 6,844,816 B1 | 1/2005 | Melton et al. | |
| 6,882,284 B2 | 4/2005 | Lake et al. | |
| 6,960,999 B2 | 11/2005 | Haimovitch et al. | |
| 7,042,357 B2 | 5/2006 | Girvin et al. | |
| 7,081,820 B2 | 7/2006 | Minarovic | |
| 7,098,794 B2 | 8/2006 | Lindsay et al. | |
| 7,119,690 B2 | 10/2006 | Lerch et al. | |
| 7,151,455 B2 | 12/2006 | Lindsay et al. | |
| 7,170,412 B2 | 1/2007 | Knox et al. | |
| 7,176,796 B2 | 2/2007 | Chen et al. | |
| 7,382,262 B2 | 6/2008 | Commagnac et al. | |
| 7,382,266 B2 | 6/2008 | Minarovic | |
| 7,383,053 B2 | 6/2008 | Kent et al. | |
| 7,791,484 B2 | 9/2010 | Commagnac et al. | |
| 7,812,719 B2 * | 10/2010 | Djuric et al. | 340/539.13 |
| 7,962,150 B2 | 6/2011 | Hertzog et al. | |
| 2001/0008390 A1 | 7/2001 | Berquist et al. | |
| 2002/0073915 A1 | 6/2002 | Howard | |
| 2002/0109607 A1 | 8/2002 | Cumeralto et al. | |
| 2003/0099158 A1 | 5/2003 | De la Huerga | |
| 2003/0234193 A1 | 12/2003 | Clouse et al. | |
| 2003/0234293 A1 | 12/2003 | Sauve et al. | |
| 2004/0066296 A1 | 4/2004 | Atherton | |
| 2004/0108954 A1 | 6/2004 | Richley et al. | |
| 2004/0212480 A1 | 10/2004 | Carrender et al. | |
| 2005/0068169 A1 | 3/2005 | Copley et al. | |
| 2005/0092072 A1 | 5/2005 | Wollenberg et al. | |
| 2005/0093702 A1 | 5/2005 | Twitchell | |
| 2005/0203681 A1 | 9/2005 | Minor | |
| 2006/0066444 A1 | 3/2006 | Steeves | |
| 2006/0092072 A1 | 5/2006 | Steiner | |
| 2006/0111123 A1 | 5/2006 | Nerat | |
| 2006/0162207 A1 | 7/2006 | Morton et al. | |
| 2006/0208887 A1 | 9/2006 | Fields et al. | |
| 2006/0220955 A1 | 10/2006 | Hamilton | |
| 2006/0238341 A1 | 10/2006 | Commagnac et al. | |
| 2007/0001809 A1 | 1/2007 | Kodukula et al. | |
| 2007/0013541 A1 | 1/2007 | Harazin et al. | |
| 2007/0052539 A1 | 3/2007 | Brown | |
| 2007/0080783 A1 | 4/2007 | Ghosh et al. | |
| 2007/0115125 A1 * | 5/2007 | Lyon et al. | 340/572.1 |
| 2007/0126579 A1 | 6/2007 | Adams et al. | |
| 2007/0126583 A1 | 6/2007 | Minawa et al. | |
| 2007/0247366 A1 | 10/2007 | Smith et al. | |
| 2007/0285245 A1 | 12/2007 | Djuric et al. | |
| 2007/0288995 A1 | 12/2007 | Terada et al. | |
| 2007/0290924 A1 | 12/2007 | McCoy | |
| 2008/0061939 A1 | 3/2008 | Davis et al. | |
| 2008/0211676 A1 | 9/2008 | Commagnac et al. | |
| 2008/0261615 A1 | 10/2008 | Kalhan | |
| 2009/0160603 A1 | 6/2009 | Bauchot et al. | |
| 2009/0160622 A1 | 6/2009 | Bauchot et al. | |
| 2009/0201154 A1 | 8/2009 | Bauchot et al. | |
| 2009/0315685 A1 | 12/2009 | Bauchot et al. | |

FOREIGN PATENT DOCUMENTS

| | | |
|---|---|---|
| JP | 2000018947 | 6/1998 |
| JP | 2001205387 | 7/2001 |
| JP | 2003141649 | 5/2003 |
| JP | 2006309592 | 11/2006 |
| KR | 20030067372 | 8/2003 |
| KR | 1020040018301 | 3/2004 |
| KR | 20050116587 | 12/2005 |
| KR | 20070010340 | 1/2007 |
| WO | 0007344 | 12/2000 |
| WO | 0106444 | 1/2001 |
| WO | 02077939 | 11/2001 |
| WO | 2005027079 | 3/2005 |
| WO | 2006010538 | 10/2006 |
| WO | 2006105381 | 10/2006 |
| WO | 2007006085 | 1/2007 |
| WO | WO 2007/002941 A2 | 1/2007 |
| WO | 2007041153 | 4/2007 |
| WO | 2007060619 | 5/2007 |
| WO | 2007064747 | 6/2007 |

OTHER PUBLICATIONS

Challstrom, C.W., NOAA Chairperson, Federal Geodetic Control Subcommittee; Input Formats and Specifications of the Geodetic Survey Data Base, Appendix P (The Description Processing handbook); Mar. 2003; Appendix P Updated Mar. 2007 U.S. Dept. of Commerce, NOAA, NGS, Silver Springs MD: http://www.ngs.noaa.gov/FGCS/BlueBook/Sections: 3.3.1.6.7 (as cited by Examiner Burgdorf on PT0892 in connection with Office Action (mail date Jan. 19, 2011) for U.S. Appl. No. 12/306,272).

Pham, et al.; Kirker-Othmer Encyclopedia of Chemical Technology, vol. 10: Epoxy Resins John Wiley & Songs, Nov. 19, 2004, p. 348, second paragraph; pp. 457-459, Section 21.4 (Other Electrical and Electronica Applications) and Section 21.5 (Adhesives) (as cited by Examiner Burgdorf on PT0892 in connection with Office Action (mail date Jan. 19, 2011) for U.S. Appl. No. 12/306,272).

Preliminary Amendment filed Dec. 23, 2008 for U.S. Appl. No. 12/306,272, Filing Date Dec. 23, 2008, GAU 2612, Confirmation No. 2136.

Preliminary Amendment filed May 11, 2009 for U.S. Appl. No. 12/306,272, Filing Date Dec. 23, 2008, GAU 2612, Confirmation No. 2136.

Office Action (Mail Date Jan. 19, 2011) for U.S. Appl. No. 12/306,272, Filing Date Dec. 23, 2008, GAU 2612, Confirmation No. 2136.

Amendment filed Apr. 12, 2011 in Response to Office Action (Mail Date Jan. 19, 2011) for U.S. Appl. No. 12/306,272, Filing Date Dec. 23, 2008, GAU 2612, Confirmation No. 2136.

Notice of Allowance (Mail Date May 13, 2011) for U.S. Appl. No. 12/306,272, Filing Date Dec. 23, 2008, GAU 2612, Confirmation No. 2136.

Request for Continued Examination filed Jul. 1, 2011 for U.S. Appl No. 12/306,272, Filing Date Dec. 23, 2008, GAU 2612, Confirmation No. 2136.

Office Action (Mail Date Aug. 9, 2011) for U.S. Appl. No. 12/306,272, Filing Date Dec. 23, 2008, GAU 2612, Confirmation No. 2136.

Amendment filed Oct. 31, 2011 in Response to Office Action (Mail Date Aug. 9, 2011) for U.S. Appl. No. 12/306,272, Filing Date Dec. 23, 2008, GAU 2612, Confirmation No. 2136.

Office Action (Mail Date Dec. 6, 2011) for U.S. Appl. No. 12/306,272, Filing Date Dec. 23, 2008, GAU 2612, Confirmation No. 2136.

Office Action (Mail Date Jan. 13, 2010) for U.S. Appl. No. 12/109,319, Filing Date Apr. 24, 2008, GAU 2612, Confirmation No. 3211.

Amendment filed Feb. 1, 2010 in Response to Office Action (Mail Date Jan. 13, 2010) for U.S. Appl. No. 12/109,319, Filing Date Apr. 24, 2008, GAU 2612, Confirmation No. 3211.

Notice of Allowance (Mail Date May 11, 2010) for U.S. Appl. No. 12/109,319, Filing Date Apr. 24, 2008, GAU 2612, Confirmation No. 3211.

Office Action—Ex Parte Quayle (Mail Date Oct. 17, 2007) for U.S. Appl. No. 11/406,911, Filing Date Apr. 19, 2006, GAU 2612, Confirmation No. 7351.
Amendment filed Nov. 6, 2007 in Response to Office Action—Ex Parte Quayle (Mail Date Oct. 17, 2007) for U.S. Appl. No. 11/406,911, Filing Date Apr. 19, 2006, GAU 2612, Confirmation No. 7351.
Notice of Allowance (Mail Date Feb. 4, 2008) for U.S. Appl. No. 11/406,911, Filing Date Apr. 19, 2006, GAU 2612, Confirmation No. 7351.
Amendment after Notice of Allowance (Rule 312) filed Feb. 15, 2008 for U.S. Appl. No. 11/406,911, Filing Date Apr. 19, 2006, GAU 2612, Confirmation No. 7351.
Supplemental Notice of Allowance (Mail Date Apr. 9, 2008) for U.S. Appl. No. 11/406,911, Filing Date Apr. 19, 2006, GAU 2612, Confirmation No. 7351.
Amendment filed Dec. 8, 2011 in Response to Office Action (Mail Date Sep. 15, 2011) for U.S. Appl. No. 12/234,772; Filing Date Sep. 22, 2008; GAU 2612; Confirmation No. 4767.
Office Action (Mail Date Nov. 29, 2011) for U.S. Appl. No. 12/336,594, Filing Date Dec. 17, 2008, GAU 2612, Confirmation No. 2197.
Wang et al., A Novel Solution to the Reader Collision Problem in RFID System, 2006 IEEE, 4 pages.
Pillai et al., Using Volatile State Storage for Substantial Improvement in RFID Throughput, IEEE Xplore, 5 pages. Oct. 17, 2005.
U.S. Appl. No. 12/335,601; Filing Date Dec. 16, 2008; GAU 2612; Confirmation No. 1388.
U.S. Appl. No. 12/336,594; Filing Date Dec. 17, 2008; GAU 2612; Confirmation No. 2197.
U.S. Appl. No. 12/234,772; Filing Date Sep. 22, 2008; GAU 2612; Confirmation No. 4767.
Office Action (Mail Date Sep. 15, 2011) for U.S. Appl. No. 12/234,772; Filing Date Sep. 22, 2008; GAU 2612; Confirmation No. 4767.
Office Action (Mail Date Jan. 31, 2012) for U.S. Appl. No. 12/335,601; Filing Date Dec. 16, 2008; GAU 2612; Confirmation No. 1388.
Amendment filed Feb. 28, 2012 in response to Office Action (Mail Date Nov. 29, 2011) for U.S. Appl. No. 12/336,594, Filing Date Dec. 17, 2008, GAU 2612, Confirmation No. 2197.
Final Office Action (Mail Date Mar. 22, 2012) for U.S. Appl. No. 12/336,594, Filing Date Dec. 17, 2008, GAU 2612, Confirmation No. 2197.
Amendment filed Mar. 5, 2012 in response to Office Action (Mail Date Dec. 6, 2011) for U.S. Appl. No. 12/306,272, Filing Date Dec. 23, 2008, GAU 2612, Confirmation No. 2136.
Final Office Action (Mail Date Apr. 10, 2012) for U.S. Appl. No. 12/306,272, Filing Date Dec. 23, 2008, GAU 2612, Confirmation No. 2136.
U.S. Appl. No. 13/418,739 Filing Date Mar. 13, 2012, Confirmation No. 1496.

* cited by examiner

LOCATION LOCALIZATION METHOD AND SYSTEM

FIELD OF THE INVENTION

The present invention relates to a method and associated system for locating passive radio frequency identification (RFID) tags.

BACKGROUND OF THE INVENTION

Locating out of range items typically comprises an inefficient process with little flexibility. Accordingly, there exists a need in the art to overcome at least some of the deficiencies and limitations described herein above.

SUMMARY OF THE INVENTION

The present invention provides a method comprising:

transmitting, by an RFID tag reader, a first request for locating a first passive RFID tag in a first facility;

receiving, by said RFID tag reader from a first group of active RFID tags in response to said first request, a first date/time associated with first data, wherein said first group of active RFID tags are located in said first facility;

receiving, by said RFID tag reader from a second group of active RFID tags in response to said first request, a second date/time associated with second data, wherein said second group of active RFID tags are located in said first facility;

determining, by said RFID tag reader, that said first date/time comprises an earlier date/time than said second date/time with respect to a current date/time;

transmitting, by said RFID tag reader to said second group of active RFID tags in response to said determining that said first date/time comprises an earlier date/time than said second date/time, a second request for retrieving said second data, wherein said second data comprises an ID for said first passive RFID tag and distances between each active RFID tag of said second group and said first passive RFID tag;

receiving, by said RFID tag reader from said second group of active RFID tags, said second data;

receiving, by said RFID tag reader from a computing system, a map of said facility and first locations on said map for said second group of active RFID tags;

determining, by said RFID tag reader, a first location within said facility for said first passive RFID tag, wherein said determining said first location is based on said second data, said map of said facility, and said first locations on said map for said second group of active RFID tags; and transmitting, by said RFID tag reader to a user, said first location.

The present invention provides an RFID tag reader comprising a processor coupled to a computer-readable memory unit, said memory unit comprising instructions that when executed by the processor implements a location localization method, said method comprising:

transmitting, by said RFID tag reader, a first request for locating a first passive RFID tag in a first facility;

receiving, by said RFID tag reader from a first group of active RFID tags in response to said first request, a first date/time associated with first data, wherein said first group of active RFID tags are located in said first facility;

receiving, by said RFID tag reader from a second group of active RFID tags in response to said first request, a second date/time associated with second data, wherein said second group of active RFID tags are located in said first facility;

determining, by said RFID tag reader, that said first date/time comprises an earlier date/time than said second date/time with respect to a current date time;

transmitting, by said RFID tag reader to said second group of active RFID tags in response to said determining that said first date/time comprises an earlier date/time than said second date/time, a second request for retrieving said second data, wherein said second data comprises an ID for said first passive RFID tag and distances between each active RFID tag of said second group and said first passive RFID tag;

receiving, by said RFID tag reader from said second group of active RFID tags, said second data;

receiving, by said RFID tag reader from a computing system, a map of said facility and first locations on said map for said second group of active RFID tags;

determining, by said RFID tag reader, a first location within said facility for said first passive RFID tag, wherein said determining said first location is based on said second data, said map of said facility, and said first locations on said map for said second group of active RFID tags; and transmitting, by said RFID tag reader to a user, said first location.

The present invention advantageously provides a simple method and associated system capable of locating out of range items.

DETAILED DESCRIPTION OF THE INVENTION

Figure 1:
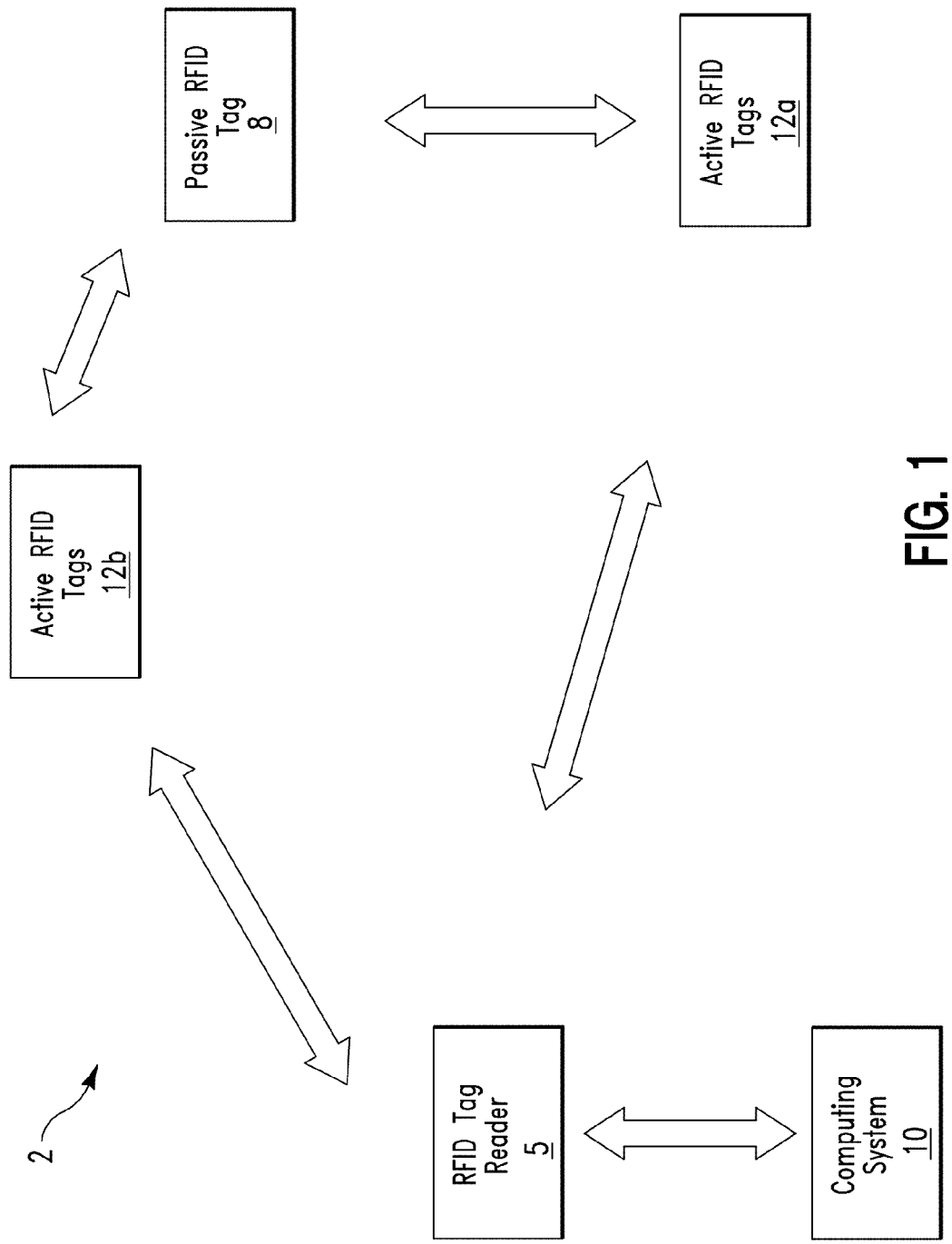
FIG. 1 illustrates a block diagram of a system for locating a passive RFID tag via active RFID tags, in accordance with embodiments of the present invention.

FIG. 1 illustrates a block diagram of a system 2 comprising a computing system 10, a radio frequency identification (RFID) tag reader (or transceiver) 5, a passive RFID tag 8, active RFID tags 12a, and active RFID tags 12b, in accordance with embodiments of the present invention. A RFID tag (e.g., passive RFID tag 8, active RFID tags 12a (e.g., proxy RFID tags), active RFID tags 12b (e.g., proxy RFID tags), etc) is a wireless device for receiving and responding (e.g., responding with an ID code, data, etc) to RF queries. A RFID tag comprises a computer readable memory unit, a central processing unit (CPU) and logic for executing functions. A passive RFID tag is defined herein as an RFID tag that receives power (i.e., for powering circuits internal to the RFID tag) from an RFID tag reader. An active RFID tag is defined herein as an RFID tag that comprises an internal (i.e., internal to the RFID tag) power source (e.g., a battery, a capacitor, etc) for powering circuits internal to the RFID tag. A passive RFID tag may only communicate (e.g., respond to RF queries) with an RFID tag reader over small distances (e.g., less than about 10 meters) because it obtains its power from the RFID tag reader. An active RFID tag may communicate (e.g., respond to RF queries) with an RFID tag reader over greater distances (e.g., up to about 100 meters) than distances between a passive RFID tag and an RFID tag reader because the active RFID tag comprises an internal power source. Due to the communication distance limitations of passive RFID tag 8, RFID tag reader 5 uses information supplied by active RFID tags 12a or active RFID tags 12b (e.g., data associated with distance information associated with a distances between passive RFID tag 8 and active RFID tags 12a or RFID tags 12b and time stamp information associated with a time and date of the measurement of the distances) and information from computing system 10 (e.g., a map of a facility comprising system 2 and locations on the map for active RFID tags 12a or active RFID tags 12b) to determine a location for passive RFID tag 8. RFID tag reader 5 uses information from RFID tags 12a or RFID tags 12b depending on the time and date information as described, infra with respect to FIG. 2. System 2 may be used in a warehouse environment to identify, track, and locate items by placing passive RFID tag 8 on the item (or on a pallet comprising the item) and using RFID reader 5 to query active RFID tags 12a and active RFID tags 12b in order to obtain data (i.e., data associated with distance information associated with distances between passive RFID tag 8 and active RFID tags 12a or active RFID tags 12b and time stamp information associated with a time and date of the measurement of the distances). Passive RFID tag 8, RFID reader 5, active RFID tags 12a, and active RFID tags 12b may each be on different floors of a facility (e.g., different floors of a warehouse). Computing system 10 may comprise, inter alia, a personal computer, a laptop computer, a computer terminal, a server computer, etc. Computing system 10 may comprise a single computing apparatus or a plurality of computing apparatuses.

System 2 allows RFID tags (passive or active) to listen neighbor RID tags responses and calculate distances between RFID tags based on the responses. Each RFID tag is able to determine a neighbor RFID Tag within a defined radius and return (i.e., when polled) a list of neighbor RFID tags detected by an RFID tag reader. The RFID reader compiles the list of neighbor RFID tags to determine all RFID tags belonging to a same package (e.g., a pallet).

An RFID tag reader performs the following functions:
1. Computes a distance between the RFID tag reader and a polled RFID tag.
2. Sets the distance between the RFID tag reader and the polled RFID tag and transmits the distance to the polled RFID tag.
3. Associates RFID tags to a group or package.

An RFID tag performs the following functions:
1. Memorizes the distance between the RFID tag reader and itself.
2. All RFID tags measure a time separating a polling request and a response from a polled RFID tag in order to:

A. Determine the distance between the polled RFID tag and itself.
B. Evaluate using a radius transmitted by the RFID tag reader.
C. Save a neighbor RFID tag ID in local memory.
D. Transmit an ID for itself.

Example 1 illustrates an implementation example for using system 2 to locate an item associated with passive RFID tag 8.

EXAMPLE 1

1. A forklift truck enters a warehouse with the pallet ID number 223 in order to stock the pallet on a shelf in the warehouse. A passive RFID (e.g., passive RFID tag 8) is placed on the pallet.
2. The forklift truck arrived at a final location for the shelf and an RFID tag reader (e.g., RFID tag reader 5) on the forklift truck interrogates the passive RFID tag.
3. The nearest active RFID tags (e.g., active RFID tags 12a and active RFID tags 12b) listen to the passive RFID tag response, log the RFID tag reader time stamp, and RFID tag IDs, and measure distances to the passive RFID tag from their own position.
4. After a time period (e.g., days, months, years, etc) the RFID tag reader on the forklift truck (i.e., looking for a location of pallet 223) transmits a request for locating pallet 223.
5. The nearest active RFID tags (e.g., active RFID tags 12a and active RFID tags 12b) respond with data associated with pallet 223 ID and time stamps.
6. The RFID tag reader receives two different time stamps:
   A. A time stamp T1 from a first group of active RFID tags.
   B. A time stamp T2 from a second group of active RFID tags.
7. The RFID tag reader determines that time stamp T1 comprises an earlier time than time stamp T2.
8. The RFID tag reader requests information (i.e., the measured distances to the passive RFID tag) from the second group of active RFID tags based on the later time stamp T2 (i.e., the more recent time stamp).
9. The REID tag reader receives from a computing system (e.g., computing system 10), a map of the warehouse and locations on the map for the second group of active RFID tags.
10. The RFID tag reader determines a location in the ware house for pallet 223. The location is determined based on the information received in step 7 and 8.
11. The RFID tag reader transmits the location to a driver of the forklift truck so that the driver may locate pallet 223.

Figure 2:
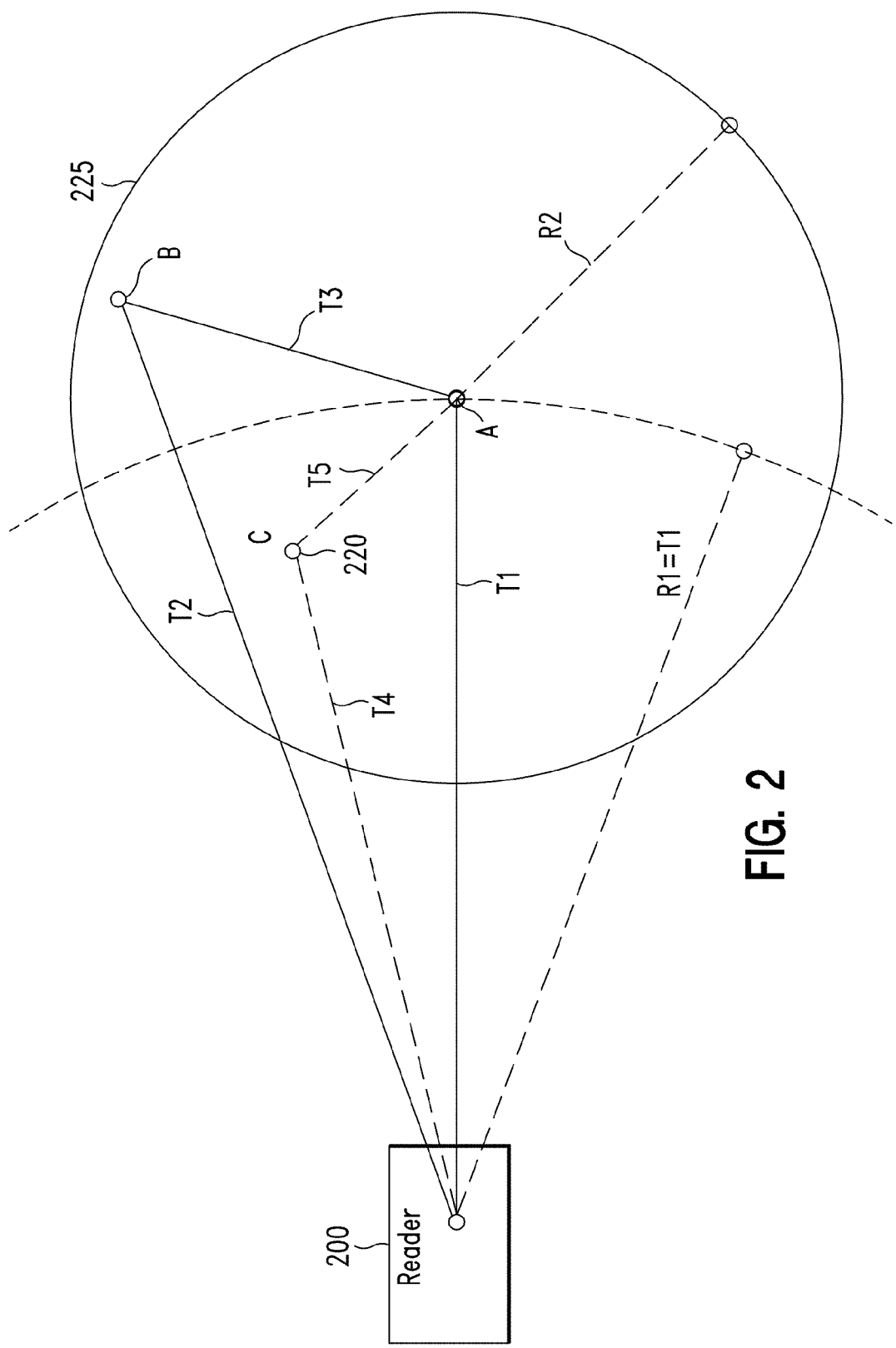
FIG. 2 illustrates a process for implementing the system of FIG. 1 for calculating a distance between a polled RFID tag and a non-polled RFID tag, in accordance with embodiments of the present invention.

FIG. 2 illustrates a process for implementing system 2 of FIG. 1 for calculating a distance between a polled RFID tag (e.g., passive RFID tag 8) and a non-polled RFID tag (e.g., one of active RFID tags 12a or 12b), in accordance with embodiments of the present invention. An RFID tag reader 200 polls an RFID Tag B. In this example, it is assumed that RFID tag A has been already been polled and therefore RFID tag A knows a distance T1 between itself and RFID tag reader 200. As soon as RFID tag B receives the polling message, distance T2 between RFID tag B and RFID tag reader 200, RFID tag B knows distance T2. After processing the polling, RFID tag B transmits a response comprising a tag Id (i.e., for RFID tag B) and the distance T2. The response is additionally received by several RFID Tags adjacent to RFID tag B. RFID tag A computes a delay Δt between a reception of the polling of RFID tag B and a response from the RFID tag B. The polling command transmitted by RFID tag reader 200 arrives in RFID tag A at time T1 and arrives in RFID tag B at time T2. RFID tag B is further than RFID tag A from RFID tag reader 200 and therefore, commands arrive in RFID tag B T2−T1 later than in RFID tag A. The response from RFID tag B arrives in RFID tag A (time reference is the command transmitted by the reader) at time T2+TP+T3. The following relationships exist with respect to T2, T3, and TP:
1. Distance T2 is proportional to the distance between RFID tag reader 200 and RFID tag B.
2. TP is the processing time.
3. Distance T3 is proportional to the distance between the RFID tag B and RFID tag A.

RFID tag A calculates distance T3 as follows:

$$\Delta t=(T2+T3+TP)-T1$$

$$\Delta t=(T2-T1)+T3+TP$$

$$T3=\Delta t-(T2-T1)-TP$$

For polling RFID tag C, the polling command arrives in RFID tag C T1-T4 earlier than in RFID tag A. RFID tag A calculates distance T5 as follows:

$$\Delta t=(T4+T5+TP)-T1$$

$$\Delta t=(T4-T1)+T5-TP$$

$$T5=\Delta t-(T4-T1)-TP$$

When RFID tag reader polls any RFID tag, it transmits the maximum distance R2 at which an RFID Tag may be considered as a neighbour RFID tag. Circle 225 with radius R2 represents an area (volume) where RFID tags are neighbours of RFID tag A.

Figure 3:
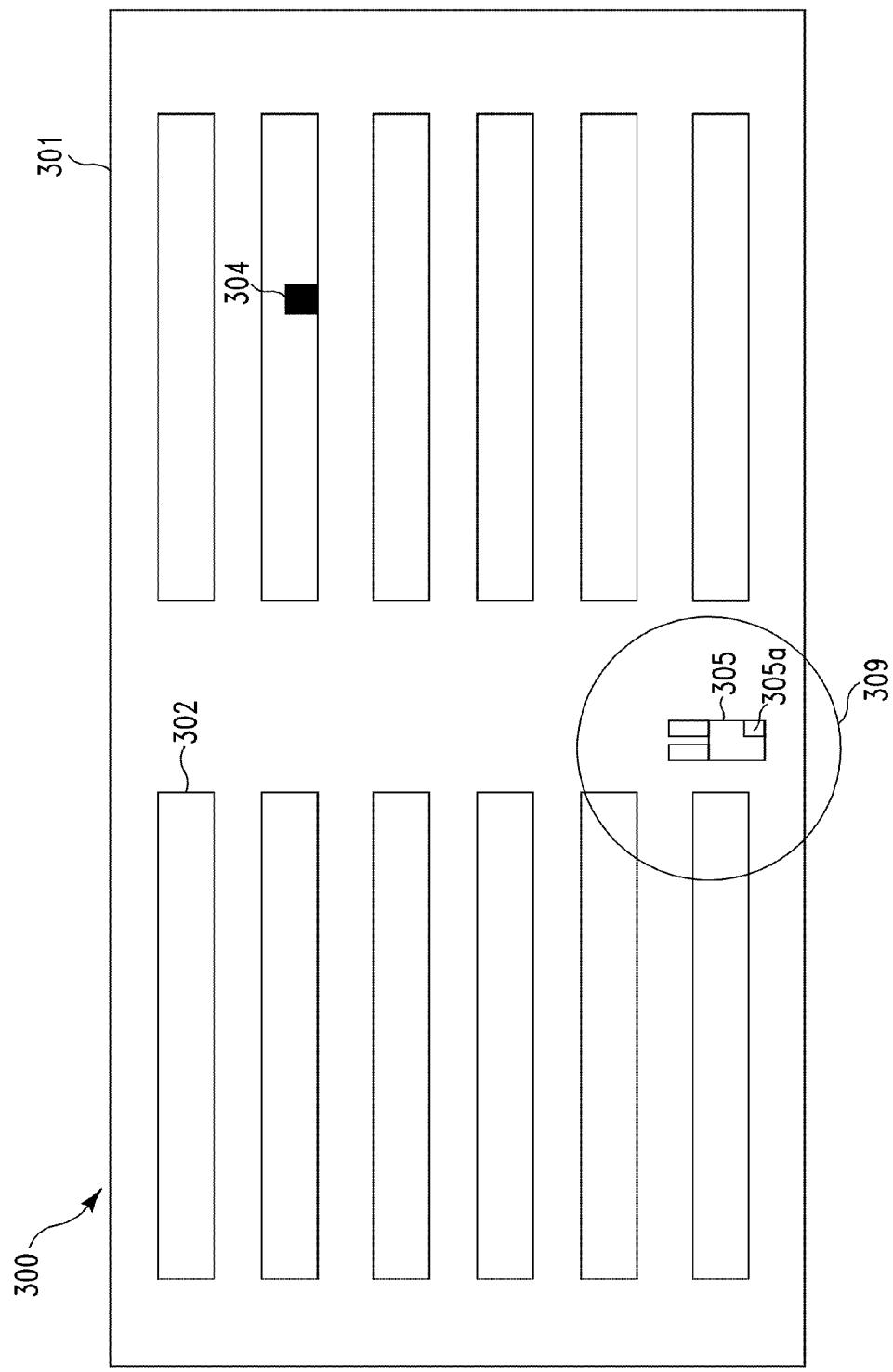
FIG. 3 illustrates a facility map describing a passive RFID tag read range, in accordance with embodiments of the present invention.

FIG. 3 illustrates a facility map 300 describing a passive RFID tag read range 309, in accordance with embodiments of the present invention. Facility map 300 comprises a facility 301 (e.g., a warehouse), rows 302 for items, an item 304 comprising a passive RFID tag and a forklift truck 305 comprising an RFID tag reader 305a. As illustrated in FIG. 3, RFID tag reader 305a has a limited passive RFID tag read range 309 and therefore RFID tag reader 305a is unable to communicate with item 304 comprising a passive RFID tag.

Figure 4:
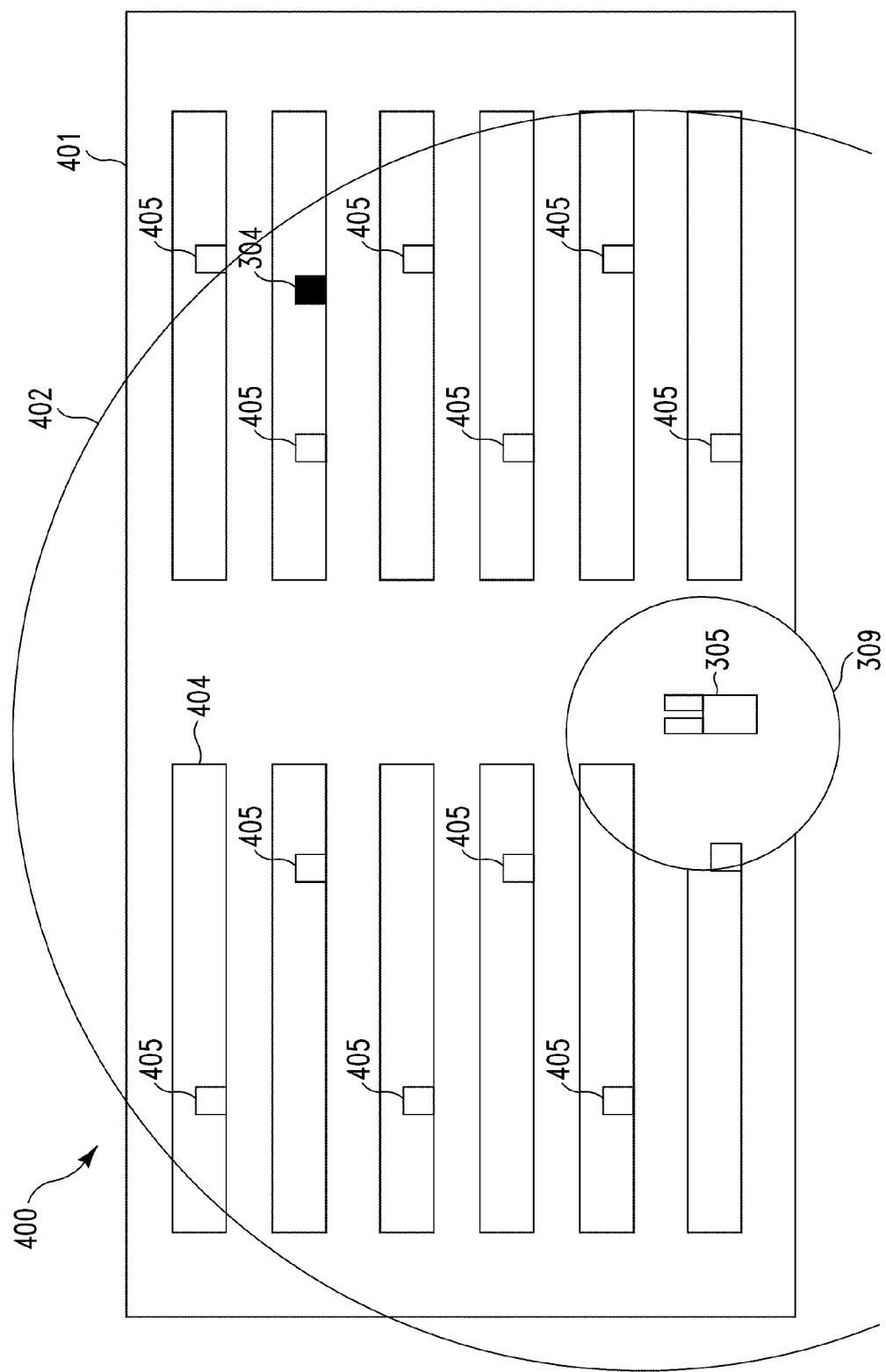
FIG. 4 illustrates a facility map describing an active RFID tag read range, in accordance with embodiments of the present invention.

FIG. 4 illustrates a facility map 400 describing an active RFID tag read range 402, in accordance with embodiments of the present invention. Facility map 400 comprises a facility 401 (e.g., a warehouse), rows 404 for items, item 304 comprising a passive RFID tag, items 405 comprising active RFID tags, and a forklift truck 305 comprising an RFID tag reader 305a. As illustrated in FIG. 4, RFID tag reader 305a has a limited passive RFID tag read range 309 and a broader active RFID tag read range 402. Therefore RFID tag reader 305a is able to communicate with items 405 comprising active RFID tags but is unable to communicate with item 304 comprising a passive RFID tag.

Figure 5:
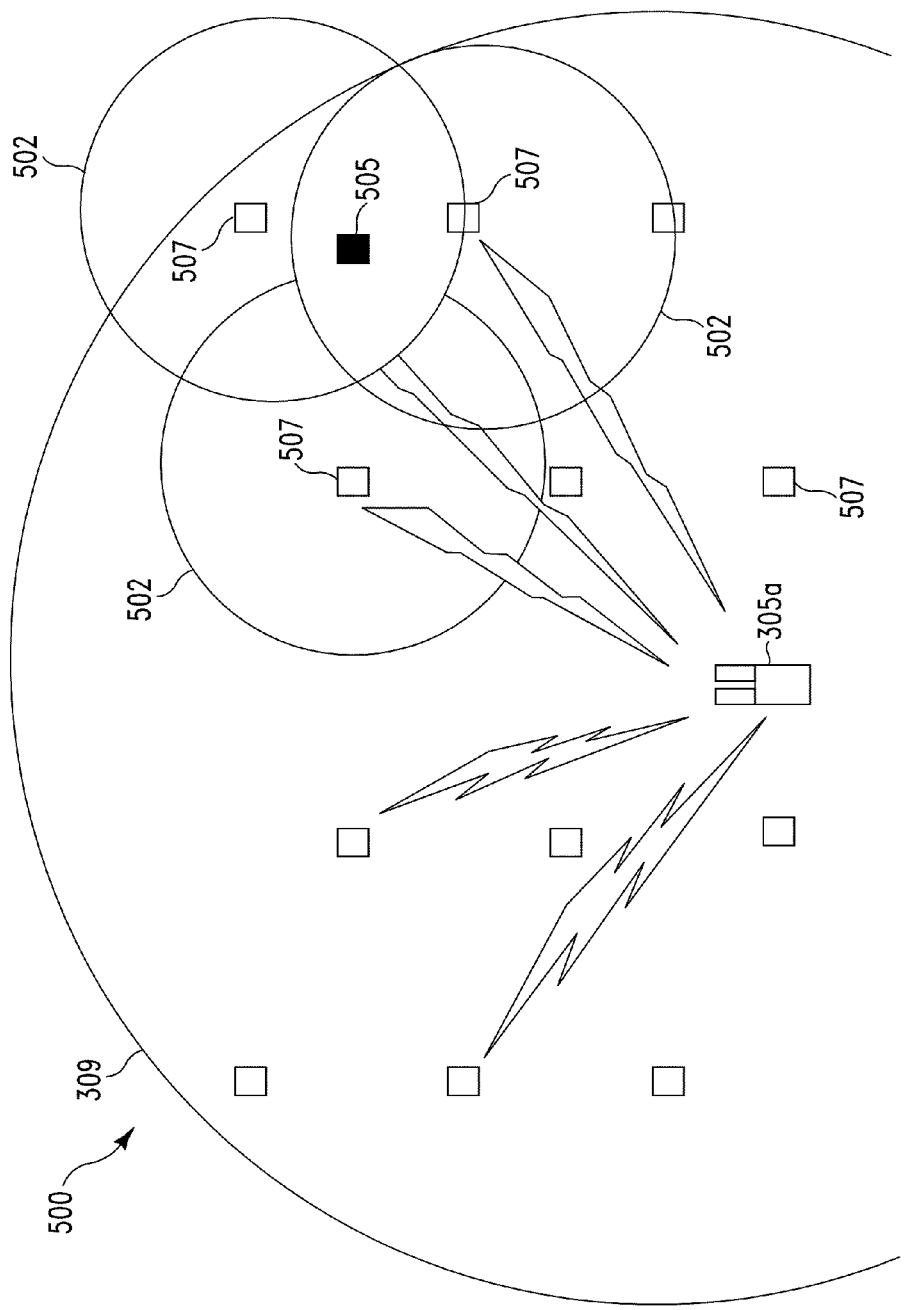
FIG. 5 illustrates a facility map describing an RFID tag listening range, in accordance with embodiments of the present invention.

FIG. 5 illustrates a facility map 500 describing an RFID tag listening range 502, in accordance with embodiments of the present invention. Facility map 500 comprises passive RFID tag read range 309, listening RFID tag 505, and responding tags 507 (i.e., for responding to RFID tag reader 305a).

Figure 6:
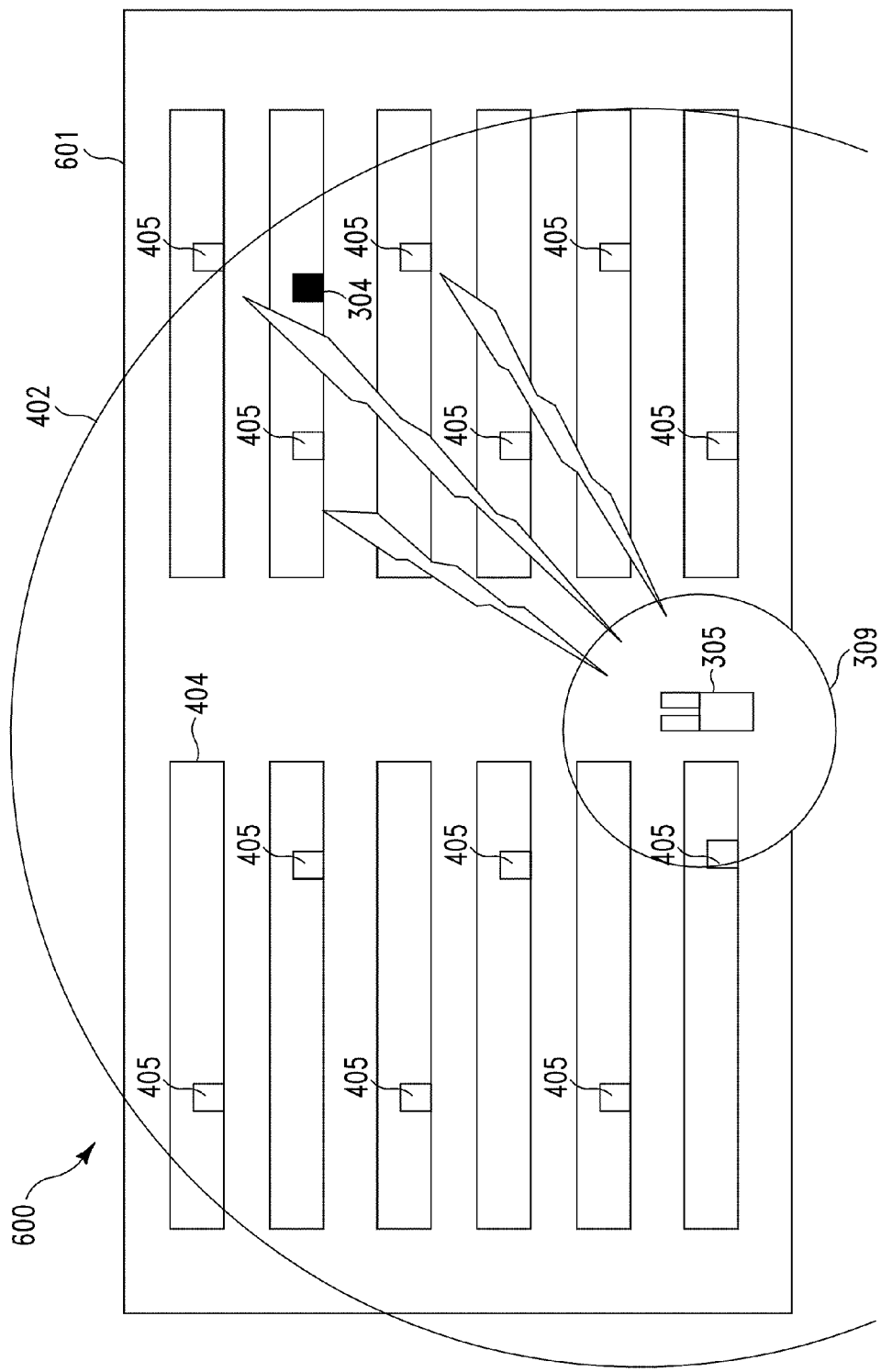
FIG. 6 illustrates a facility map describing a communication process for communicating with a passive RFID tag via active RFID tags, in accordance with embodiments of the present invention.

FIG. 6 illustrates a facility map 600 describing a communication process for communicating with a passive RFID tag via Active RFID tags, in accordance with embodiments of the present invention. Facility map 600 comprises a facility 601 (e.g., a warehouse), rows 404 for items, item 304 comprising a passive RFID tag, items 405 comprising active RFID tags, and a forklift truck 305 comprising an RFID tag reader 305a. As illustrated in FIG. 4, RFID tag reader 305a has a limited passive RFID tag read range 309 and a broader active RFID tag read range 402. Therefore RFID tag reader 305a is able to communicate item 304 comprising an active RFID tag via communications with items 405 comprising active RFID tags as described with reference to FIGS. 1 and 2, supra, and FIG. 6, infra.

Figure 7:
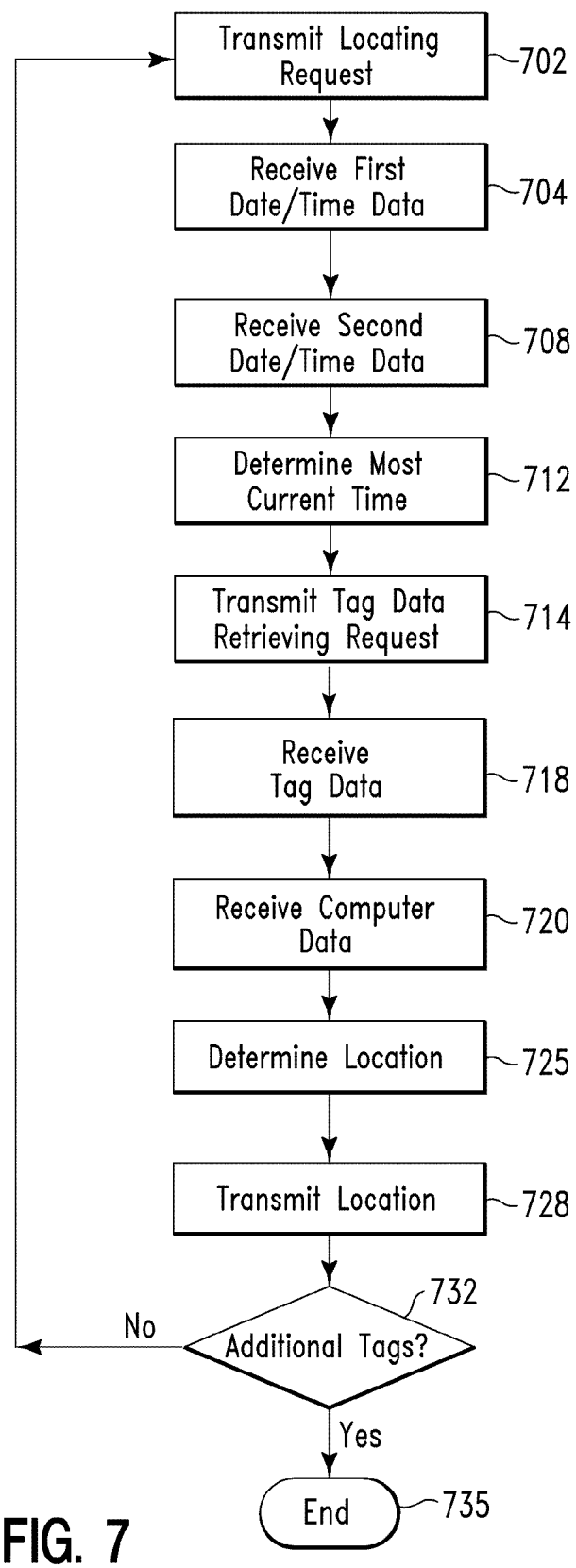
FIG. 7 illustrates a flowchart describing an algorithm used by the system of FIG. 1 for locating a passive RFID tag via active RFID tags, in accordance with embodiments of the present invention.

FIG. 7 illustrates a flowchart describing an algorithm used by system 2 of FIG. 1 for locating a passive RFID tag via active RFID tags, in accordance with embodiments of the present invention. In step 702, an RFID tag reader on a forklift truck (e.g., RFID tag reader 5 of FIG. 1) transmits a request for locating an item (e.g., a pallet) comprising a passive RFID tag in a facility. In step 704, the RFID tag reader receives from a first group of RFID tags (e.g., active of passive), first data/time data associated with first data. The first date/time data indicates a date and time that the first data was retrieved. In step 707, the RFID tag reader receives from a second group of RFID tags (e.g., active of passive), second data/time data associated with second data. The second date/time data indicates a date and time that the second data was retrieved. In step 712, the RFID tag reader determines that the first date/time data comprises an earlier date/time than the second date/time data with respect to a current date/time. In step 714, RFID tag reader transmits a request to the second group of active RFID tags a request for retrieving the second data. The second data may comprise an ID for the passive RFID tag and distances between each RFID tag of the second group of RFID tags and the first passive RFID tag. In step 718, the RFID tag reader receives the second data from the second group of RFID tags. In step 720, the RFID tag reader receives stored data from a computing system. The stored data comprises a map of the facility and locations on said map for the second group of RFID tags. In step 725, the REID tag reader determines a location within the facility for the passive RFID tag. The location is determined based on said second data, the map of the facility, and the locations on said map for the second group of RFID tags. In step 728, the RFID reader transmits the location a user (e.g., the driver of the forklift truck). In step 732, it is determined if additional items (with passive RFID tags) are to be located. If in step 732, it is determined that additional items (with passive RFID tags) are to be located then step 702 is repeated to locate additional passive RFID tags. The additional passive RFID tags may be located anywhere in the facility (e.g., on a different floor). If in step 732, it is determined that additional items (with passive RFID tags) are not to be located then the process is terminated in step 735.

Figure 8:
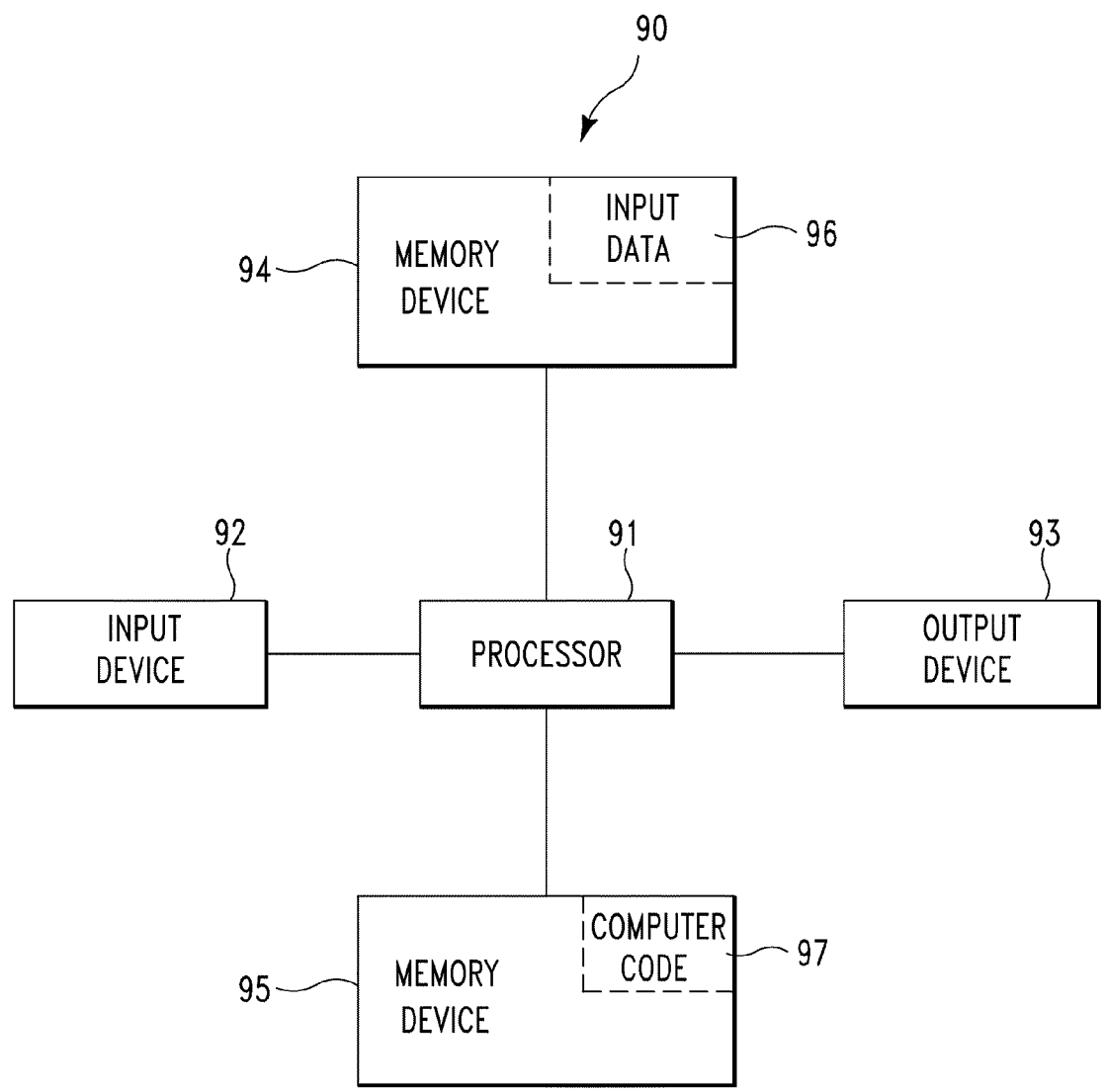
FIG. 8 illustrates a computer apparatus used for locating a passive RFID tag via active RFID tags, in accordance with embodiments of the present invention.

FIG. 8 illustrates a computer apparatus 90 (e.g., computing system 10 or RFID tag reader 5 of FIG. 1) used for locating a passive RFID tag via active RFID tags, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 7) for locating a passive RFID tag via active RFID tags. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may comprise the algorithm of FIG. 7 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to locate a passive RFID tag via active RFID tags. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for locating a passive RFID tag via active RFID tags. In another embodiment, the invention provides a business method that performs the process steps of the invention on a subscription, advertising, and/or fee basis. That is, a service provider, such as a Solution Integrator, could offer to locate a passive RFID tag via active RFID tags. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
transmitting, by an RFID tag reader, a first request for locating a first passive RFID tag in a first facility;
receiving, by said RFID tag reader from a first group of active RFID tags in response to said first request, a first date/time associated with first data, wherein said first group of active RFID tags are located in said first facility;
receiving, by said RFID tag reader from a second group of active RFID tags in response to said first request, a second date/time associated with second data, wherein said second group of active RFID tags are located in said first facility;
determining, by said RFID tag reader, that said first date/time comprises an earlier date/time than said second date/time with respect to a current date/time;
transmitting, by said RFID tag reader to said second group of active RFID tags in response to said determining that said first date/time comprises an earlier date/time than said second date/time, a second request for retrieving said second data, wherein said second data comprises an ID for said first passive RFID tag and distances between each active RFID tag of said second group and said first passive RFID tag;
receiving, by said RFID tag reader from said second group of active RFID tags, said second data;
receiving, by said RFID tag reader from a computing system, a map of said facility and first locations on said map for said second group of active RFID tags;
determining, by said RFID tag reader, a first location within said facility for said first passive RFID tag, wherein said determining said first location is based on said second data, said map of said facility, and said first locations on said map for said second group of active RFID tags; and
transmitting, by said RFID tag reader to a user, said first location.

2. The method of claim 1, further comprising:
transmitting, by said RFID tag reader, a third request for locating a second passive RFID tag in said first facility;
receiving, by said RFID tag reader from a single active RFID tag in response to said third request, third data, wherein said single active RFID tag is located in said first facility, wherein said third data comprises an ID for said single active RFID tag and directions to a third group of active RFID tags associated with said second passive RFID tag, and wherein said third group of active RFID tags comprises fourth data;
processing, by said RFID tag reader, said third data;
transmitting, by said RFID tag reader to said third group of active RFID tags in response to said processing said third data, a fourth request for retrieving said fourth data, wherein said fourth data comprises an ID for said second passive RFID tag and distances between each active RFID tag of said third group and said second passive RFID tag;
receiving, by said RFID tag reader from said third group of active RFID tags in response to said fourth request, said fourth data;
receiving, by said RFID tag reader from a computing system, second locations on said map for said third group of active RFID tags;
determining, by said RFID tag reader, a second location within said facility for said second passive RFID tag, wherein said determining said second location is based on said third data, said fourth data, said map of said facility, and said second locations on said map for said third group of active RFID tags; and
transmitting, by said RFID tag reader to said user, said second location.

3. The method of claim 1, further comprising:
transmitting, by said RFID tag reader, a third request for locating a second passive RFID tag in said first facility;
receiving, by said RFID tag reader from a third passive RFID tag in response to said third request, third data, wherein said third passive RFID tag is located in said first facility, wherein said third data comprises an ID for said second passive RFID tag and a distances between said third passive RFID tag and said second passive RFID tag;
processing, by said RFID tag reader, said third data;
receiving, by said RFID tag reader from a computing system, a second location on said map for said third passive RFID tag;
determining, by said RFID tag reader, a third location within said facility for said second passive RFID tag, wherein said determining said third location is based on said third data, said map of said facility, and said second location on said map for said for said third passive RFID tag; and transmitting, by said RFID tag reader to said user, said third location.

4. The method of claim 1, wherein said RFID tag reader, said first passive RFID tag, said first group of active RFID tags, and said second group of active RFID tags are located on a first floor of said facility, and wherein said method further comprises:

transmitting, by said RFID tag reader, a third request for locating a second passive RFID tag on a second floor of said first facility, wherein said second floor differs from said first floor;

receiving, by said RFID tag reader from a third group of active RFID tags in response to said third request, a first response comprising first location data associated with said third group of active RFID tags, wherein said third group of active RFID tags are located on said first floor;

receiving, by said RFID tag reader from a fourth group of active RFID tags in response to said third request, a second response comprising second location data associated with said fourth group of active RFID tags, wherein said fourth group of active RFID tags are located on said second floor;

determining, by said RFID tag reader based on said second location data, that said fourth group of active RFID tags are located on said second floor;

transmitting, by said RFID tag reader to said fourth group of active RFID tags in response to said determining that said fourth group of active RFID tags are located on said second floor, a fourth request for retrieving third data, wherein said third data comprises an ID for said second passive RFID tag and distances between each active RFID tag of said fourth group and said second passive RFID tag;

receiving, by said RFID tag reader from said fourth group of active RFID tags, said third data;

receiving, by said RFID tag reader from a computing system, second locations on said map for said fourth group of active RFID tags;

determining, by said RFID tag reader, a second location on said second floor for said second passive RFID tag, wherein said determining said second location is based on said third data, said map of said facility, and said second locations on said map for said fourth group of active RFID tags; and transmitting, by said RFID tag reader to said user, said second location.

5. The method of claim 1, wherein said receiving said first data by said RFID tag reader and said receiving said second data by said RFID tag reader occur simultaneously.

6. The method of claim 1, wherein each RFID tag of said first group of active RFID tags and each RFID tag of said second group of active RFID tags comprises an internal power source.

7. The method of claim 6, wherein internal power source is a battery.

8. The method of claim 1, wherein said RFID tag reader is unable to receive a signal from said first passive RFID tag.

9. The method of claim 1, wherein said first passive RFID tag is associated with a first group of items located in said first facility.

10. A computer program product, comprising a computer-readable storage device comprising a computer readable program code embodied therein, said computer readable program code configured to perform the method of claim 1 upon being executed by a processor of said RFID tag reader.

11. A process for supporting computer infrastructure, said process comprising providing at least one support service for at least one of creating, integrating, hosting, maintaining, and deploying computer-readable code in a computing system, wherein the code in combination with the RFID tag reader is capable of performing the method of claim 1.

12. An RFID tag reader comprising a processor coupled to a computer-readable memory unit, said memory unit comprising instructions that when executed by the processor implements a location localization method, said method comprising:

transmitting, by said RFID tag reader, a first request for locating a first passive RFID tag in a first facility;

receiving, by said RFID tag reader from a first group of active RFID tags in response to said first request, a first date/time associated with first data, wherein said first group of active RFID tags are located in said first facility;

receiving, by said RFID tag reader from a second group of active RFID tags in response to said first request, a second date/time associated with second data, wherein said second group of active RFID tags are located in said first facility;

determining, by said RFID tag reader, that said first date/time comprises an earlier date/time than said second date/time with respect to a current date time;

transmitting, by said RFID tag reader to said second group of active RFID tags in response to said determining that said first date/time comprises an earlier date/time than said second date/time, a second request for retrieving said second data, wherein said second data comprises an ID for said first passive RFID tag and distances between each active RFID tag of said second group and said first passive RFID tag;

receiving, by said RFID tag reader from said second group of active RFID tags, said second data;

receiving, by said RFID tag reader from a computing system, a map of said facility and first locations on said map for said second group of active RFID tags;

determining, by said RFID tag reader, a first location within said facility for said first passive RFID tag, wherein said determining said first location is based on said second data, said map of said facility, and said first locations on said map for said second group of active RFID tags; and transmitting, by said RFID tag reader to a user, said first location.

13. The RFID tag reader of claim 12, wherein said method further comprises:

transmitting, by said RFID tag reader, a third request for locating a second passive RFID tag in said first facility;

receiving, by said RFID tag reader from a single active RFID tag in response to said third request, third data, wherein said single active RFID tag is located in said first facility, wherein said third data comprises an ID for said single active RFID tag and directions to a third group of active RFID tags associated with said second passive RFID tag, and wherein said third group of active RFID tags comprises fourth data;

processing, by said RFID tag reader, said third data;

transmitting, by said RFID tag reader to said third group of active RFID tags in response to said processing said third data, a fourth request for retrieving said fourth data, wherein said fourth data comprises an ID for said second passive RFID tag and distances between each active RFID tag of said third group and said second passive RFID tag;

receiving, by said RFID tag reader from said third group of active RFID tags in response to said fourth request, said fourth data;

receiving, by said RFID tag reader from a computing system, second locations on said map for said third group of active RFID tags;

determining, by said RFID tag reader, a second location within said facility for said second passive RFID tag, wherein said determining said second location is based on said third data, said fourth data, said map of said facility, and said second locations on said map for said third group of active RFID tags; and transmitting, by said RFID tag reader to said user, said second location.

14. The RFID tag reader of claim 12, wherein said method further comprises:

transmitting, by said RFID tag reader, a third request for locating a second passive RFID tag in said first facility;

receiving, by said RFID tag reader from a third passive RFID tag in response to said third request, third data, wherein said third passive RFID tag is located in said first facility, wherein said third data comprises an ID for said second passive RFID tag and a distances between said third passive RFID tag and said second passive RFID tag;

processing, by said RFID tag reader, said third data;

receiving, by said RFID tag reader from a computing system, a second location on said map for said third passive RFID tag;

determining, by said RFID tag reader, a third location within said facility for said second passive RFID tag, wherein said determining said third location is based on said third data, said map of said facility, and said second location on said map for said for said third passive RFID tag; and transmitting, by said RFID tag reader to said user, said third location.

15. The RFID tag reader of claim 12, wherein said RFID tag reader, said first passive RFID tag, said first group of active RFID tags, and said second group of active RFID tags are located on a first floor of said facility, and wherein said method further comprises:

transmitting, by said RFID tag reader, a third request for locating a second passive RFID tag on a second floor of said first facility, wherein said second floor differs from said first floor;

receiving, by said RFID tag reader from a third group of active RFID tags in response to said third request, a first response comprising first location data associated with said third group of active RFID tags, wherein said third group of active RFID tags are located on said first floor;

receiving, by said RFID tag reader from a fourth group of active RFID tags in response to said third request, a second response comprising second location data associated with said fourth group of active RFID tags, wherein said fourth group of active RFID tags are located on said second floor;

determining, by said RFID tag reader based on said second location data, that said fourth group of active RFID tags are located on said second floor;

transmitting, by said RFID tag reader to said fourth group of active RFID tags in response to said determining that said fourth group of active RFID tags are located on said second floor, a fourth request for retrieving third data, wherein said third data comprises an ID for said second passive RFID tag and distances between each active RFID tag of said fourth group and said second passive RFID tag;

receiving, by said RFID tag reader from said fourth group of active RFID tags, said third data;

receiving, by said RFID tag reader from a computing system, second locations on said map for said fourth group of active RFID tags;

determining, by said RFID tag reader, a second location on said second floor for said second passive RFID tag, wherein said determining said second location is based on said third data, said map of said facility, and said second locations on said map for said fourth group of active RFID tags; and transmitting, by said RFID tag reader to said user, said second location.

16. The RFID tag reader of claim 12, wherein said receiving said first data by said RFID tag reader and said receiving said second data by said RFID tag reader occur simultaneously.

17. The RFID tag reader of claim 12, wherein each RFID tag of said first group of active RFID tags and each RFID tag of said second group of active RFID tags comprises an internal power source.

18. The RFID tag reader of claim 17, wherein internal power source is a battery.

19. The RFID tag reader of claim 12, wherein said RFID tag reader is unable to receive a signal from said first passive RFID tag.

20. The RFID tag reader of claim 12, wherein said first passive RFID tag is associated with a first group of items located in said first facility.

* * * * *